INVENTOR.
HOWARD W. SIMPSON
ARAM ABGARIAN
BY
ATTORNEYS

INVENTOR.
HOWARD W. SIMPSON
ARAM ABGARIAN
ATTORNEYS

June 10, 1941. H. W. SIMPSON ET AL 2,245,452
MOWING MACHINE
Filed June 10, 1940 3 Sheets-Sheet 3
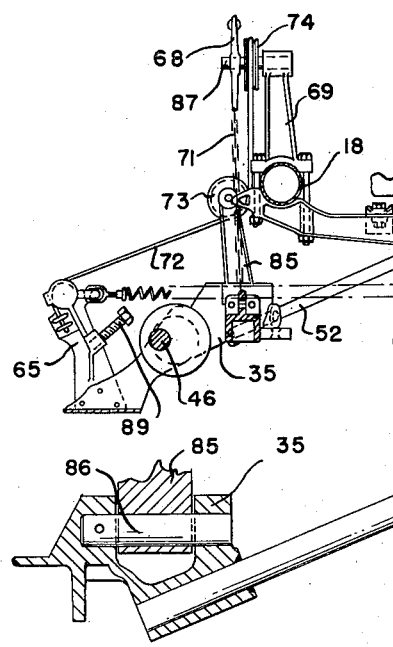
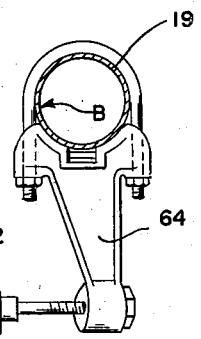
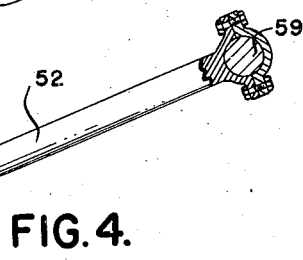
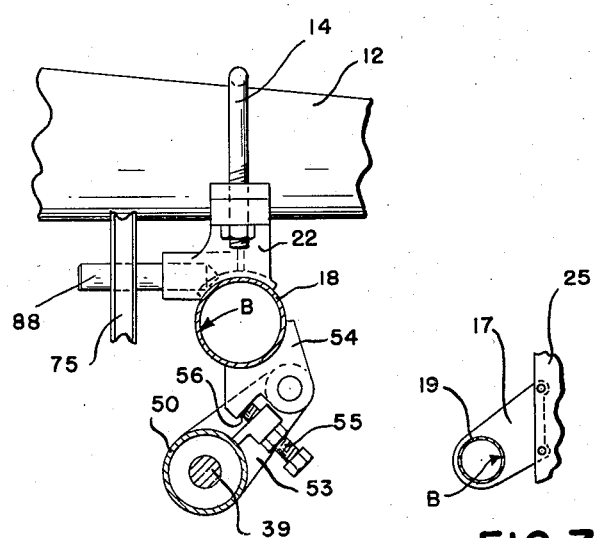
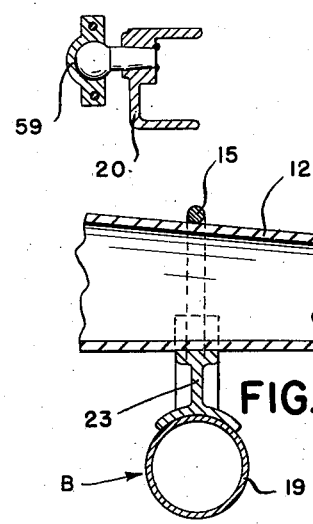
INVENTOR.
HOWARD W. SIMPSON
ARAM ABGARIAN
BY
ATTORNEYS Patented June 10, 1941

2,245,452

UNITED STATES PATENT OFFICE 2,245,452

MOWING MACHINE

Howard W. Simpson, Dearborn, and Aram Abgarian, Detroit, Mich., assignors to Detroit Harvester Company, Detroit, Mich., a corporation of Michigan Application June 10, 1940, Serial No. 339,800

18 Claims. (Cl. 56—25)

This invention relates generally to mowing machines such as tractor operated mowers, and constitutes an improvement upon the structure embodied in the application filed January 22, 1940, bearing Serial No. 315,112.

One of the essential objects of the invention is to provide the tractor with a removable auxiliary frame for carrying the mower structure. Thus, the grey iron castings of the tractor to which various supporting brackets and parts of the mower structure have in the past been connected will be relieved of loads and strains which otherwise might cause them to be injured or broken.

Another object is to suspend the mower assembly in such a way from the auxiliary frame that (1) the angle between the propeller shaft and crank shaft is reduced, and (2) the mounting for the mower assembly is up closer to the tractor and thus affords greater ground clearance.

Another object is to utilize the universally mounted propeller shaft housing in conjunction with a universally mounted transversely extending rod for supporting the mower assembly from the auxiliary frame on the tractor. Thus, the usual longitudinally extending rod and associated parts heretofore used for such purposes are unnecessary and have been dispensed with entirely.

Another object is to provide a mower structure wherein the housing for a part of the drive mechanism for the sickle bar is adjustable relative to the auxiliary frame to serve as a belt tightener.

Another object is to improve generally the structure and operation of machines of the type mentioned.

Other objects, advantages and novel details of construction of this invention will be made more apparent as this description proceeds, especially when considered in connection with the accompanying drawings, wherein:

Figure 3 is a cross sectional view taken substantially on the line 3—3 of Figure 2;

Figure 4 is a sectional view taken substantially on the line 4—4 of Figure 2;

Figure 5 is a sectional view taken substantially on the line 5—5 of Figure 1;

Figure 6 is a sectional view taken on the line 6—6 of Figure 2;

Figure 7 is a sectional view taken on the line 7—7 of Figure 2;

Figure 8 is a sectional view taken on the line 8—8 of Figure 2;

Figure 9 is a sectional view taken on the line 9—9 of Figure 2.

Figure 1:
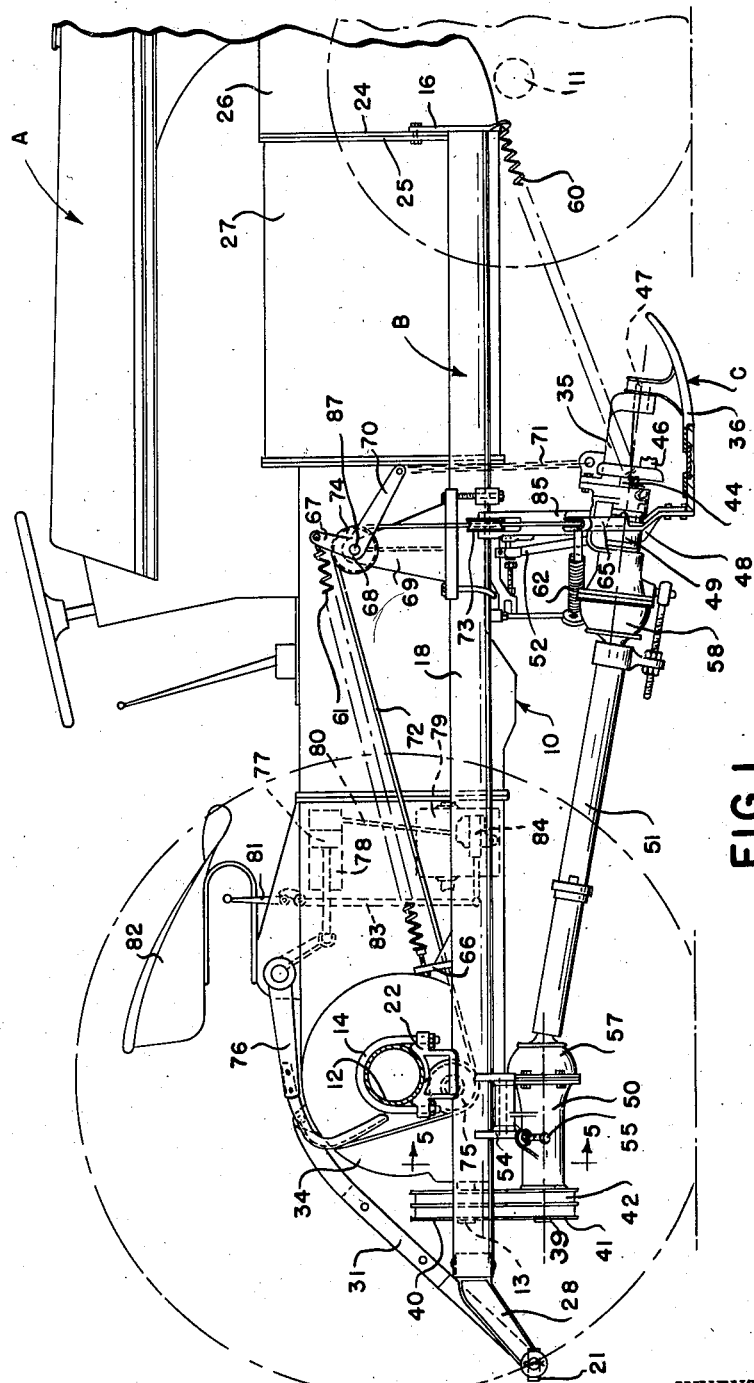
Figure 1 is a fragmentary longitudinal sectional view through a mowing machine embodying our invention.
Figure 2:
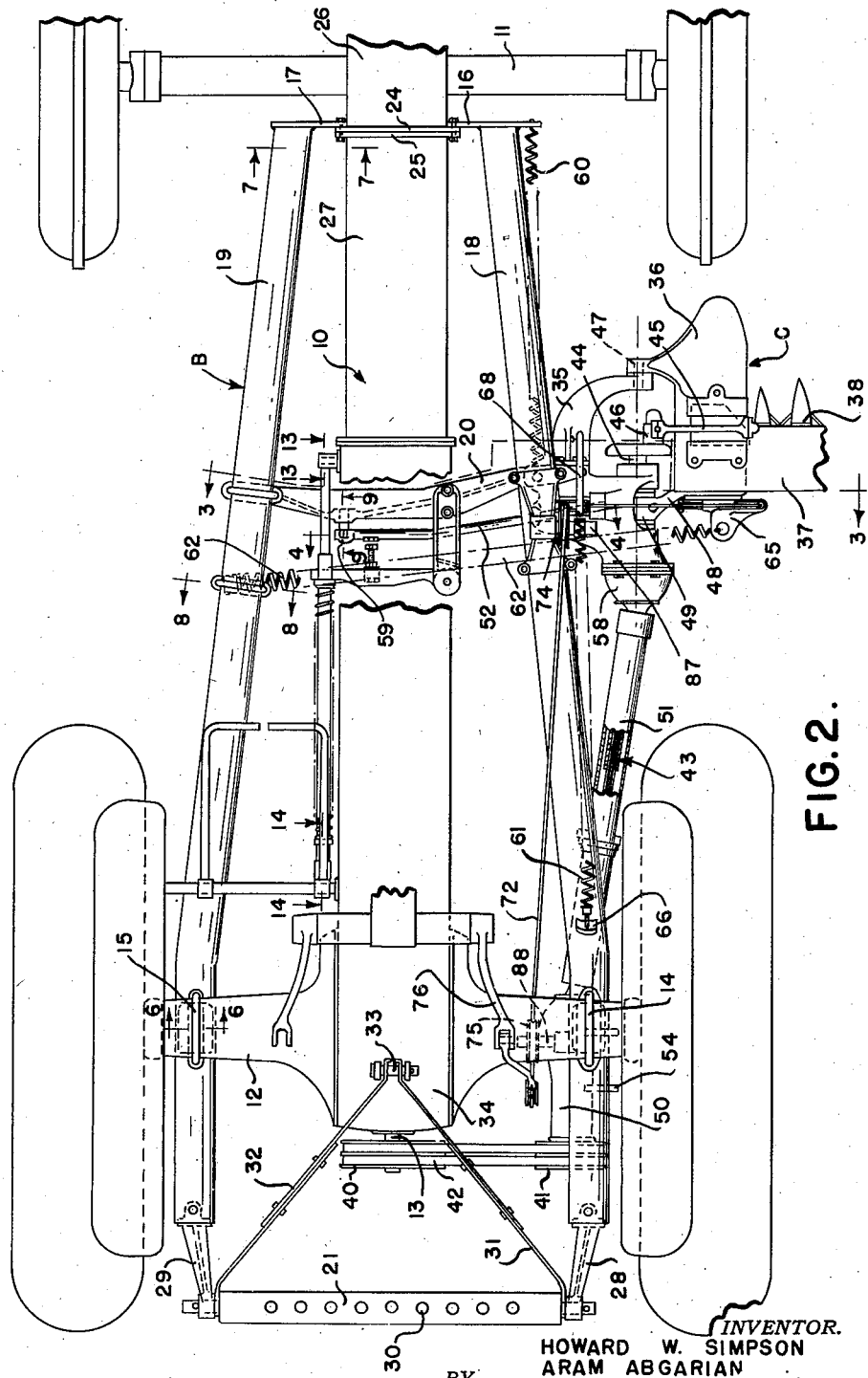
Figure 2 is a top plan view of the structure shown in Figure 1.

Referring now to the drawings, A is the tractor, B is the auxiliary frame, and C is the mower assembly of a mowing machine embodying our invention.

As shown, the tractor A is conventional in design and has a chassis 10 including the front and rear axle housings 11 and 12, respectively, and a power take-off shaft 13.

The auxiliary frame B is supported by U-bolts 14 and 15 and plates 16 and 17 from the chassis of the tractor and comprises two longitudinally extending tubes 18 and 19, a crossbeam 20, and a transversely extending hitch bar 21. The U-bolts 14 and 15 straddle the rear axle housing 12 and are secured to brackets 22 and 23 rigid with the tubes 18 and 19, while the plates 16 and 17 are rigid with the tubes 18 and 19 at the forward ends and are bolted to the meeting flanges 24 and 25, respectively, of suitable castings 26 and 27 of the chassis. Preferably the forward casting 26 is formed of steel and is connected to and constitutes a support for the front axle housing 11. If desired, such support 26 may be an iron casting or a forging or a steel stamping of sufficient strength for the purposes set forth. The casting 27 is the cylinder block of the engine and may be of any suitable material. The crossbeam 20 is located substantially midway between the connections just mentioned and is bolted to the tubes 18 and 19. The hitch bar 21 is carried by rearwardly extending end pieces or arms 28 and 29, respectively, of the tubes 18 and 19 and has a series of holes 30 therein for receiving couplings (not shown) for plows, harrows and other appliances or devices. Preferably this hitch bar 21 is provided with suitable braces 31 and 32 that converge toward and are secured to an anchorage pin 33 on the housing 34 of the chassis.

The mower assembly C is hingedly connected to a supporting bracket 35 and preferably comprises a ground-engaging shoe 36, a mower bar 37 rigid with and projecting laterally outward from said shoe, and a reciprocating cutter bar or sickle bar 38 carried by said mower bar.

The driving means from the power take-off shaft 13 of the tractor to the sickle bar 38 preferably comprises a transmission shaft 39 substantially parallel to the power take-off shaft 13, pulleys 40 and 41, respectively, carried by said shafts 13 and 39, belts 42 reeved on said pulleys, a propeller shaft 43 connected by a universal joint (not shown) to the transmission shaft 39 and inclined downwardly and forwardly therefrom at substantially an eight-degree angle relative to the ground, a crank shaft 44 connected by a universal joint (not shown) to the lower end of the propeller shaft 43 and inclined downwardly and forwardly at substantially a seven-degree angle relative to the ground, and a pitman 45 terminally connected to the crank portion 46 of the crank shaft and to the sickle bar 38.

In the present instance, the hinge connection between the mower assembly C and the supporting bracket 35 includes a pin 47 and an arm 48. As shown, the pin 47 extends through adjacent portions of the shoe 36 and bracket 35 and is in axial alignment with the crank shaft 44, while the arm 48 is rigid with the shoe 36 and has a bearing portion 49 mounted to turn in concentric relation about the crank shaft 44. Thus, the mower assembly C is mounted to swing about the axis of the crank shaft 44, which, as stated above, is inclined downwardly and forwardly at substantially a seven-degree angle relative to the ground.

Suitable housings 50 and 51 are provided for the transmission and propeller shafts 39 and 43, respectively. Preferably the housing 50 for the transmission shaft is adjustably connected to the auxiliary frame B so as to serve as a belt tightener, while the housing 51 for the propeller shaft 43 is utilized in conjunction with a transversely extending rod 52 for supporting the bracket 35 and the mower assembly C from the auxiliary frame B on the tractor. As shown, a bracket 53 rigid with the transmission shaft housing 50 is pivotally connected to a bracket 54 fixed to the underside of the tube 18. An adjusting screw 55 threadedly engages the bracket 53 and bears against a shoulder 56 of the bracket 54. Thus, by adjusting the screw 55 the housing 50 for the transmission shaft 39 carrying pulley 41 may be moved relative to the power take-off shaft 13 to loosen or tighten the belts 42 as desired.

The propeller shaft housing 51 is connected at one end by a universal joint 57 to the transmission shaft housing 50 and is connected at its other end by a universal joint 58 to the hinge bracket 35.

The transversely extending rod 52 projects laterally from the hinge bracket 35 and is connected at its remote end by a universal joint 59 to the crossbeam 20. Preferably this universal connection 59 is at the left side of the tractor and is higher than the universal connection 57 between the housings 50 and 51, so that the supporting bracket 35 for the mower assembly C is mounted for swinging movement about a diagonal axis inclined rearwardly and downwardly at an angle comparable with the seven-degree angle previously mentioned relative to the hinge connection between the mower assembly C and bracket 35, to compensate for and counteract any tendency of the mower assembly to tilt or incline forwardly when swinging upwardly or downwardly about said hinge connection relative to the ground.

To permit the mower bar 37 and sickle bar 38 carried thereby to swing back in substantially a horizontal plane a limited amount when an obstacle is encountered during operation of the machine, both the tubular housing 51 and propeller shaft 43 are of the telescoping type as set forth in the application Serial No. 315,112. A coil spring 60 terminally connected to the hinge bracket 35 and to the attaching plate 16 normally holds the mower bar 37 at substantially right angles to the tractor for proper cutting action, but is of course yieldable to permit the backswing mentioned of the mower bar when an obstacle is encountered.

For counterbalancing the mower assembly, we have provided two coil springs 61 and 62, respectively. Preferably the spring 62 extends transversely beneath the tractor and is terminally connected to a depending arm 64 rigid with the tube 19 of the auxiliary frame and to an upstanding arm 65 rigid with the mower shoe 36. The spring 61 extends longitudinally of the tractor and is terminally connected to a bracket 66 rigid with the tube 18 of the auxiliary frame and to an upstanding arm 67 of a bell crank lever 68 pivoted on a bracket 69 rigid with the tube 18 of the auxiliary frame. The depending arm 70 of the bell crank lever is connected by a chain 71 to the hinge bracket 35.

In the present instance, the mower assembly C is raised and lowered relative to the ground by a hydraulically actuated cable 72. As shown, the cable is trained about suitable pulleys 73, 74 and 75, respectively, and is terminally connected to the upright arm 65 on the shoe 36 and to a lever 76 actuated from a piston 77 within a hydraulic cylinder 78. As usual, the tractor carries a pump 79 that is operatively connected to the engine of the tractor and is connected to the cylinder 78 by a conduit 80. A manually operable lever 81 is provided adjacent the driver's seat 82 of the tractor and is connected by suitable linkage 83 to a valve (not shown) in the casing 84 for controlling the flow of the fluid from the pump 79 through the conduit 80 to the cylinder 78.

Preferably the pulley 73 for the cable 72 is carried by an upright arm 85 connected by a pivot pin 86 to the hinge bracket 35, while the pulley 74 and the bell crank lever 68 are carried by a stub shaft 87 projecting laterally from the bracket 69. The pulley 75 is carried by a stub shaft 88 rigid with the bracket 22. Thus, when the cable 72 is actuated by the lever 76 to raise the mower assembly C, the hinge bracket 35 will swing upwardly about the universal joints 59 and 57, and the mower shoe 36 and bar 37 carried thereby will swing about the hinge connection with said bracket 35. An adjustable pin 89 carried by the upright arm 65 on the shoe is engageable with the hinge bracket 35 to limit upward swinging movement of the mower arm.

What we claim as our invention is:

1. In a mowing machine, a tractor having a chassis including a power take-off shaft, an auxiliary frame supported from the chassis, a mower assembly supported from the auxiliary frame and including a sickle bar, a driving connection between the power take-off shaft and sickle bar including a transmission shaft substantially parallel to said power take-off shaft, pulleys on said power take-off and transmission shafts, a belt reeved on said pulleys, and a housing for said transmission shaft adjustable relative to said auxiliary frame to tighten or loosen the belt on said pulleys.

2. In a mowing machine, a tractor having a chassis including a power take-off shaft, an auxiliary frame supported from the chassis, a mower assembly supported from the auxiliary frame and including a sickle bar, a driving connection between the power take-off shaft and sickle bar including a transmission shaft substantially parallel to said power take-off shaft, pulleys on said power take-off and transmission shafts, a belt reeved on said pulleys, and means for varying the tension of the belt on said pulleys, including a housing for the transmission shaft pivotally connected to said auxiliary frame, and means for swinging the housing about its pivotal connection.

3. In a mowing machine, a tractor having a power take-off shaft, an auxiliary frame carried by said tractor, a mower assembly including a sickle bar, a driving connection between the power take-off shaft and sickle bar including a transmission shaft, and means for supporting said mower assembly from the auxiliary frame including a housing for the transmission shaft adjustably suspended from said auxiliary frame.

4. In a mowing machine, a tractor having a power take-off shaft, an auxiliary frame carried by said tractor, a mower assembly beside the tractor and including a sickle bar, a driving connection between the power take-off shaft and sickle bar including a transmission shaft operatively connected to the power take-off shaft, a propeller shaft connected to the transmission shaft, and means for supporting the mower assembly from the auxiliary frame including a housing for the transmission shaft connected to the auxiliary frame, a housing for the propeller shaft having a universal connection with the housing for the transmission shaft, a supporting bracket for the mower assembly having a universal connection with the propeller shaft housing, and a rod projecting from the bracket and having a universal connection with the auxiliary frame.

5. In a mowing machine, the combination with a tractor provided at its forward end with castings having meeting flanges, one of said castings being a support for a front axle of the tractor, the other being a cylinder block of an internal combustion engine, and bolts connecting said flanges, of a mower assembly at one side of the tractor, and supporting means for said mower assembly including an auxiliary frame having portions fastened by the bolts aforesaid to said meeting flanges.

6. In a mowing machine, the combination with a tractor, and a mower assembly at one side of the tractor, of means for supporting the mower assembly from the tractor including tubes at opposite sides and connected to the tractor, two brackets carried by one of said tubes at spaced points longitudinally thereof, and counterbalancing means for the mower assembly including a pivotally mounted bell crank lever on one of said brackets, a chain terminally connected to said lever and mower assembly, and a coil spring terminally connected to the lever and to the other of the brackets.

7. In a mowing machine, the combination with a tractor, and a mower assembly at one side of the tractor, of means for supporting the mower assembly from the tractor including tubes extending lengthwise of the tractor at opposite sides thereof, and means for counterbalancing the mower assembly including two brackets on one of said tubes at spaced points longitudinally thereof, a bell crank lever on one of said brackets, a coil spring terminally connected to the other of said brackets and to said bell crank lever, a chain terminally connected to said lever and mower assembly, a bracket on the other of said tubes, and a coil spring terminally connected to the mower assembly and last mentioned bracket.

8. In a mowing machine, the combination with a tractor having a power take-off shaft, a mower assembly adjacent the tractor and including a cutter bar, and a driving connection between the power take-off shaft and cutter bar including a transmission shaft, and a propeller shaft, of a pivotally mounted housing for the transmission shaft, a hinge bracket for the mower assembly, and a housing for the propeller shaft universally connected at one end to the transmission shaft housing and universally connected at its other end to the hinge bracket.

9. In a mowing machine, the combination with a tractor having a chassis including front and rear axle housings and a support for the front axle housing, of an auxiliary frame supported by U-bolts and plates from the chassis, the U-bolts straddling the rear axle housing, and the plates being rigid with the auxiliary frame and bolted to the support for the front axle housing.

10. In a mowing machine, the combination with a tractor having a chassis including front and rear axle housings and a support for the front axle housing, of an auxiliary frame including longitudinally extending tubes supported by U-bolts and plates from the chassis, the U-bolts straddling the rear axle housing, and the plates being rigid with and projecting laterally from the forward ends of the tubes and bolted to the support for the front axle housing.

11. In a mowing machine, the combination with a tractor having a chassis including power take-off shaft, a mower assembly adjacent the tractor and including a cutter bar, and a driving connection between the power take-off shaft and cutter bar including a transmission shaft, and a belt for transmitting a driving force from the power take-off shaft to the transmission shaft, of an auxiliary frame supported from the chassis of the tractor and including a longitudinally extending member, a tubular housing for the transmission shaft, pivotally connected brackets rigid with the auxiliary frame and tubular housing respectively, and an adjustable element carried by one of said brackets and engageable with the other to swing the tubular housing relative to the auxiliary frame so that the belt aforesaid may be loosened or tightened.

12. In a mowing machine, the combination with a tractor having a rear axle housing and a power take-off shaft, a mower assembly adjacent the tractor and including a cutter bar, and a driving connection between the power take-off shaft and the cutter bar including a transmission shaft, of means for supporting the mower assembly and transmission shaft from the tractor including an auxiliary frame extending longitudinally of the tractor, a bracket rigid with said frame suspended from the housing and having means for supporting a part of a power lift mechanism for the mower assembly, and a tubular housing for said transmission shaft suspended from said auxiliary frame.

13. In a mowing machine, the combination with a tractor having a chassis, and a mower assembly adjacent the tractor, of means for supporting the mower assembly from the tractor including an auxiliary frame supported from the chassis and including a transverse bar, a hinge bracket for the mower assembly, and a rod projecting laterally from the hinge bracket and universally connected to said transverse bar.

14. In a mowing machine, the combination with a tractor having a chassis and a power take-off shaft, a mower assembly including a cutter bar, and a driving connection between the power take-off shaft and cutter bar including a transmission shaft and a propeller shaft, of means for supporting the mower assembly from the tractor including an auxiliary frame supported from the chassis, a supporting bracket connected to the mower assembly, a rod projecting from the supporting bracket and connected to said auxiliary frame, and housings for the transmission and propeller shafts aforesaid, one of said housings being connected to the auxiliary frame.

15. In a mowing machine, the combination with a tractor having a chassis and a power take-off shaft, a mower assembly including a cutter bar, and a driving connection between the power take-off shaft and cutter bar including a transmission shaft and a propeller shaft, of means for supporting the mower assembly from the tractor including an auxiliary frame supported from the chassis, a supporting bracket hingedly connected to the mower assembly, a rod projecting laterally from the supporting bracket and universally connected to said auxiliary frame, and universally connected housings for the transmission and propeller shafts aforesaid, one of said housings being connected to the auxiliary frame, the universal connection between the rod and auxiliary frame being at a higher elevation than the universal connection between said shaft housings so that the supporting bracket for the mower assembly may swing about a diagonal axis inclined downward relative to the auxiliary frame.

16. In a mowing machine, the combination with a tractor having a chassis including front and rear axle housings and a support for the front axle housing, and a mower assembly adjacent the tractor, of means for supporting the mower assembly from the tractor including an auxiliary frame having a member extending longitudinally of the chassis, a supporting bracket connected to the rear axle housing and to said longitudinally extending member, and a supporting member connected to said longitudinally extending member and to the support for the front axle housing.

17. In a mowing machine, the combination with a tractor having a chassis including front and rear axle housings and a support for the front axle housing, of an auxiliary frame extending longitudinally of the chassis, and means for supporting said frame from the chassis including U-bolts straddling the rear axle housing, brackets connected to the U-bolts and connected to said auxiliary frame, and plates connected to the auxiliary frame and to the support for the front axle housing.

18. In a mowing machine, the combination with a tractor having a chassis including front and rear axle housings and a support for the front axle housing, of an auxiliary frame extending longitudinally of the chassis, and means for supporting said frame from the chassis including brackets connected to said rear axle housing and to said auxiliary frame, and plates connected to the auxiliary frame and to the support for the front axle housing.

HOWARD W. SIMPSON.
ARAM ABGARIAN.